Oct. 6, 1964  R. G. GARDINER  3,151,729
APPARATUS FOR FEEDING AND ORIENTING FRUIT
Filed June 26, 1963  3 Sheets-Sheet 1
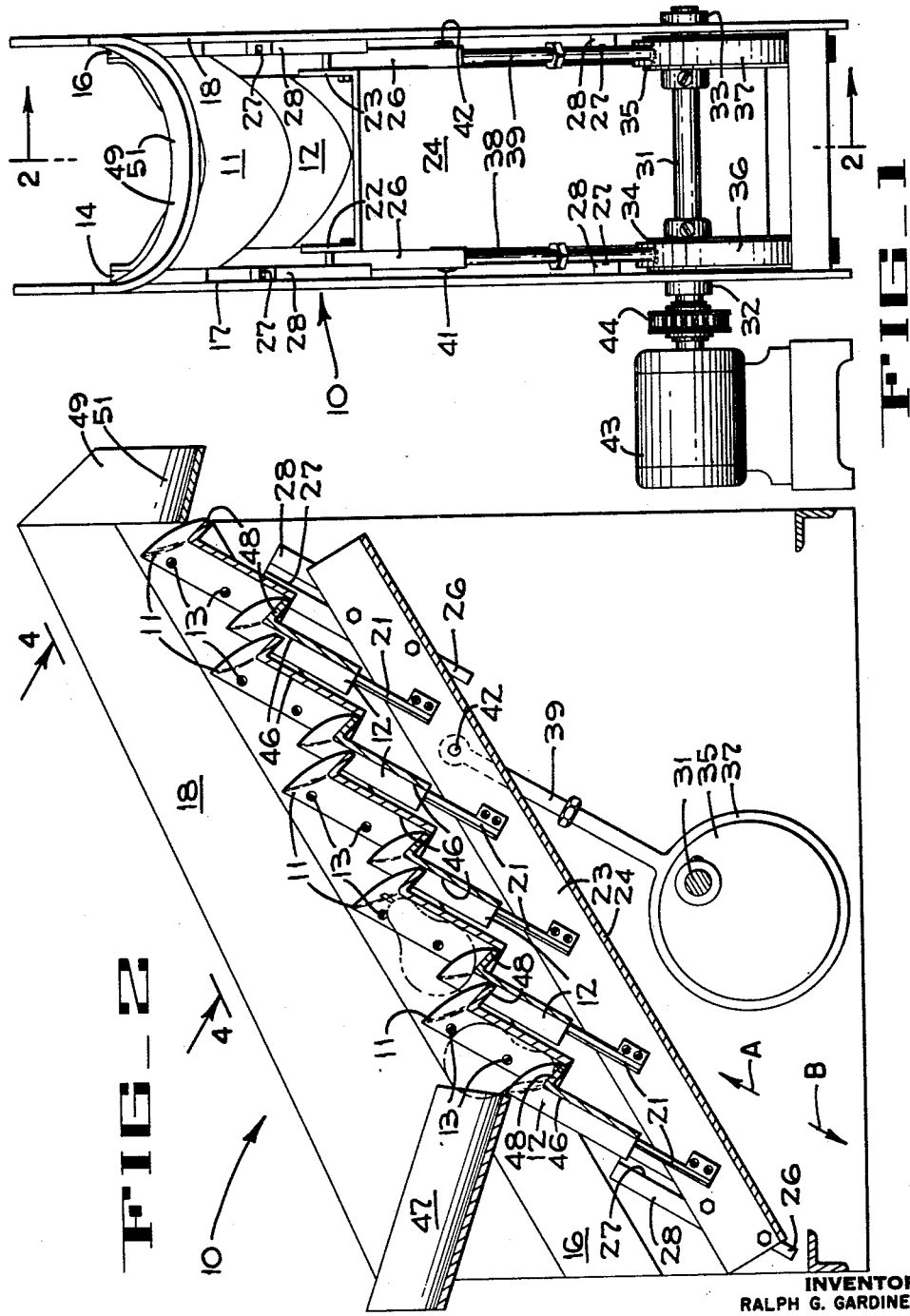
INVENTOR
RALPH G. GARDINER
BY Hans G. Hoffmeister
ATTORNEY

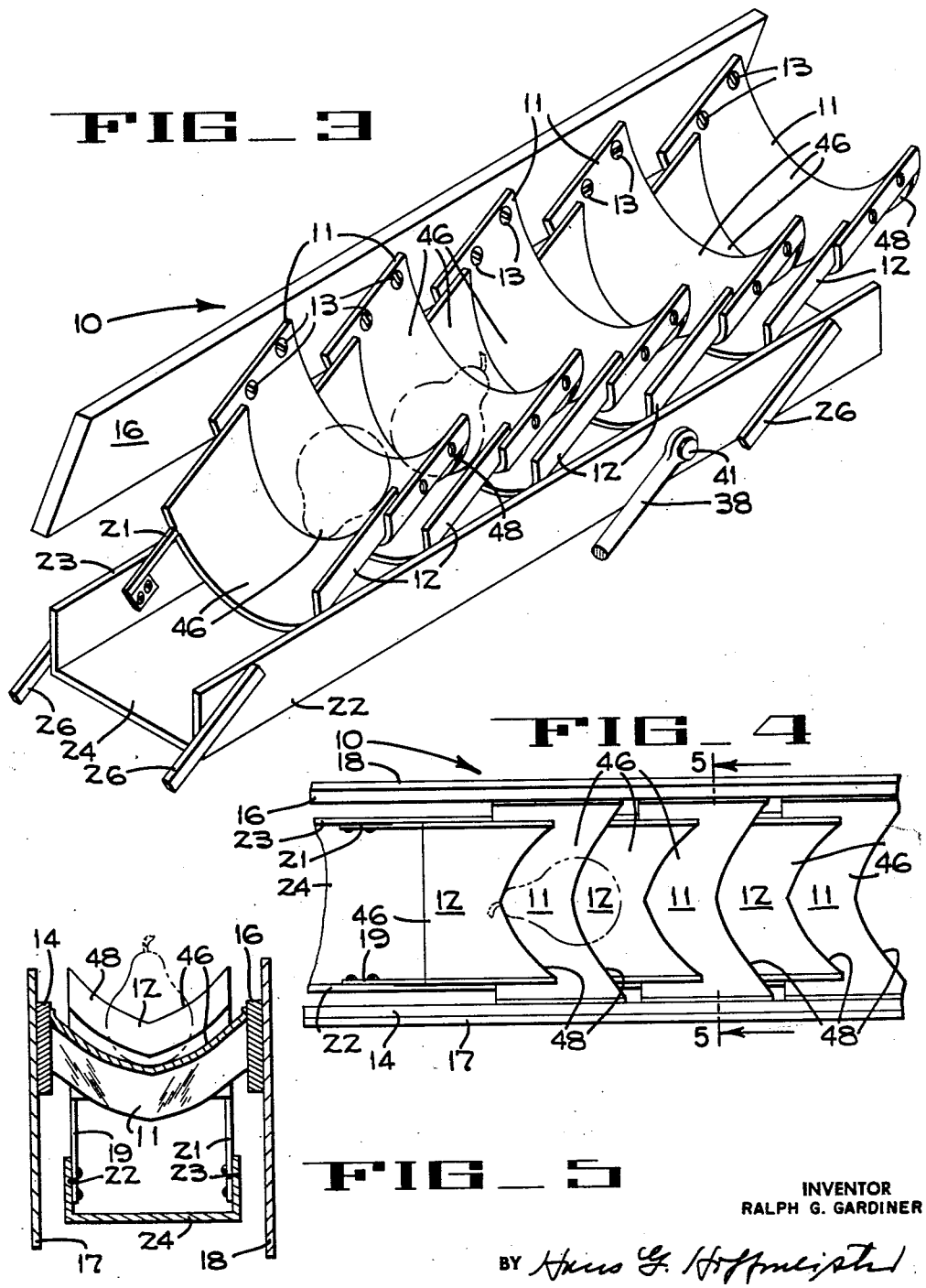

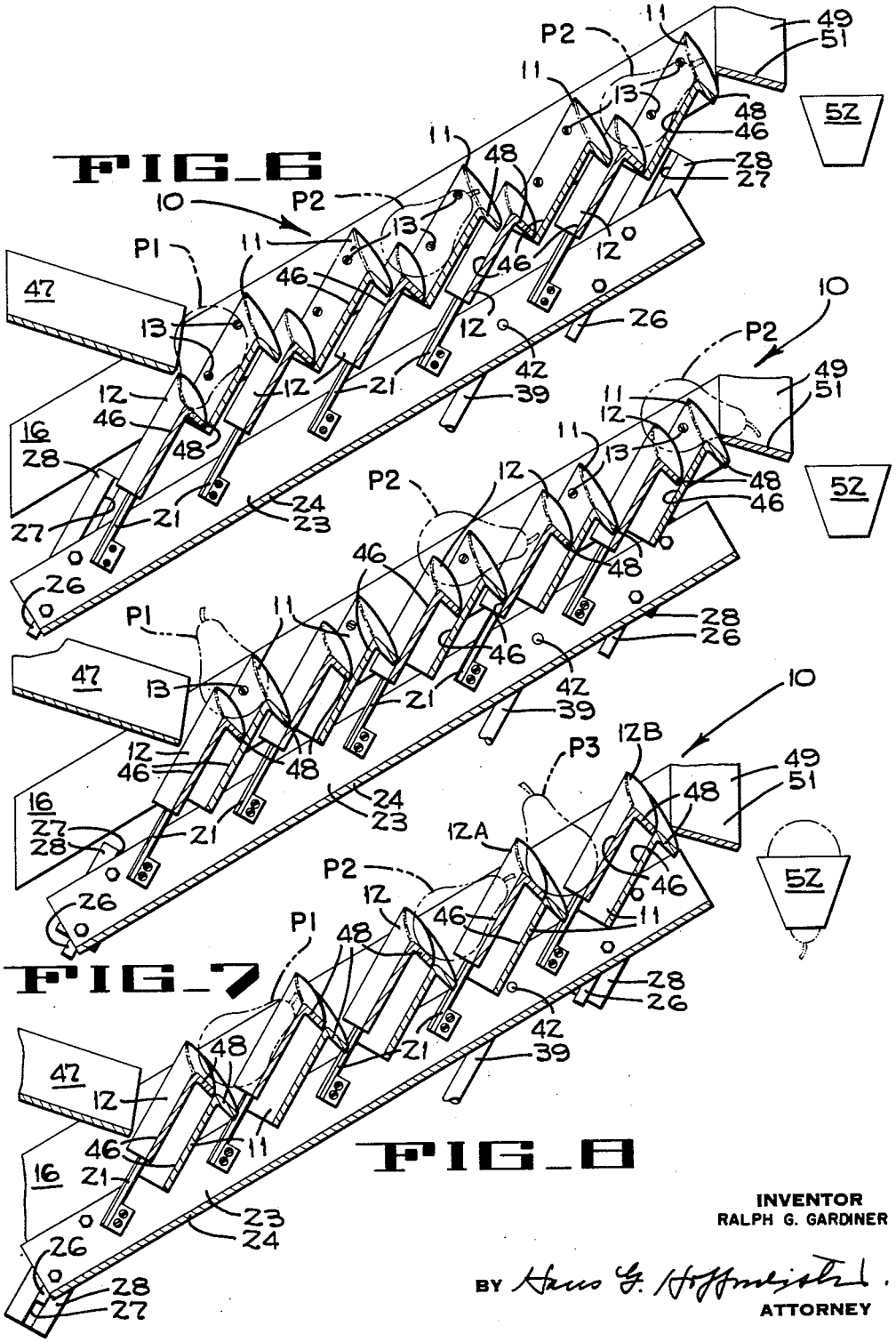

United States Patent Office 3,151,729
Patented Oct. 6, 1964

3,151,729
APPARATUS FOR FEEDING AND
ORIENTING FRUIT
Ralph G. Gardiner, San Jose, Calif., assignor to FMC Corporation, San Jose, Calif., a corporation of Delaware
Filed June 26, 1963, Ser. No. 290,734
5 Claims. (Cl. 198—33)

This invention pertains to fruit feeding and orienting apparatus and more particularly relates to a pear feeding and orienting apparatus of the shuffle feed type.

In order to effectively perform certain processing operations on pears, it is necessary to orient the pears with their stem ends projecting in a predetermined direction and to direct the oriented pears one at a time and at regular intervals into feed cups of fruit processing machines.

It is, therefore, one object of the present invention to provide an efficient apparatus for orienting pears with their stem ends foremost.

Another object is to provide an apparatus for orienting pears with their stem ends foremost and for feeding the oriented pears one at a time in single file and at regular intervals into feed cups of a fruit processing machine.

These and other objects and advantages of the present invention will become apparent from the following description and the accompanying drawings in which:

FIG. 1 is an end elevation of the pear feeding and orienting apparatus of the present invention.

FIG. 2 is a vertical section taken along lines 2—2 of FIG. 1.

FIG. 3 is an enlarged schematic perspective of the fixed and movable shuffles of the pear feeding and orienting apparatus.

FIG. 4 is a schematic plan looking in the direction of arrows 4—4 of FIG. 2 but showing the shuffles in an operating position different than the position of FIG. 2.

FIG. 5 is a schematic section looking in the direction of arrows 5—5 of FIG. 4.

FIGS. 6, 7 and 8 are schematic operational views showing the manner in which the pears are aligned and fed to a fruit processing cup.

The pear feeding and orienting apparatus 10 (FIGS. 1 and 2) of the present invention is of the shuffle feed type and includes a plurality of stationary shuffles 11 and a plurality of movable shuffles 12 associated therewith. The stationary shuffles 11 are secured by screws 13 to upwardly inclined spacer bars 14 and 16 which are in turn, secured to vertical side walls 17 and 18, respectively, of the apparatus 10.

The movable shuffles 12, one being associated with each stationary shuffle 11, are disposed closely adjacent to and are arranged to sweep over the associated stationary shuffles 11. Each movable shuffle 12 includes a pair of rearwardly projecting legs 19 and 21 (FIG. 5) which are bolted to vertical walls 22 and 23, respectively, of a channel-shaped reciprocating carrier 24.

To guide the carrier 24 and the movable shuffles thereon for reciprocating movement in the directions indicated by arrows A and B (FIG. 2) each of four inclined keys 26 is bolted to a corner of the channel shaped carrier 24, and each key 26 is slidably received in a slot 27 in one of four guide blocks 28. As indicated in FIG. 1, two of the guide blocks 28 are rigidly secured to the side wall 17 while the other two blocks are secured to the side wall 18.

In order to reciprocate the carrier 24 and movable shuffles secured thereto, an eccentric shaft 31 is journalled in bearings 32 and 33 secured to the walls 17 and 18. A pair of eccentrics 34 and 35 (FIG. 1) are keyed to the shaft 31. Eccentric straps 36 and 37 journalled on the eccentrics 34 and 35, respectively, are pivotally connected by adjustable arms 38 and 39 to shouldered bolts 41 and 42 secured to the carrier 24. The shaft 31 is connected to a motor 43 by a flexible coupling 44, and the motor drives the carrier 24 and movable shuffles 12 at approximately 50 strokes per minute in a direction inclined at approximately 45° to the horizontal.

The shapes of the stationary shuffles 11 and movable shuffles 12 are substantially the same, and form an important part of the present invention. As shown in FIGS. 3, 4 and 5, the upper pear supporting and aligning surfaces 46 of the shuffles are concave so as to cause the pears, which are fed one at a time down a feed chute 47 (FIG. 2) onto the shuffles, to roll to a position wherein their stem-blossom axes are parallel to the walls 17 and 18. A plate 48 is formed on the upper forward edge of each of the stationary shuffles 11 and movable shuffles 12 as seen in FIGS. 2 and 4. These plates are also concavely curved so as to provide a pocket to more effectively cradle the stem or blossom end of the pear and to aid in its orientation during the upward stroke of the movable shuffles 12. The line of intersection of each end plate 48 with the curved surface 46 of its associated shuffle defines a compound curved upper edge which serves to maintain the stem-blossom axis of the pear in a vertical plane as it moves from one shuffle to the next.

The lower edge of each end plate 48 is curved and lies closely adjacent the curved upper surface of the adjacent movable shuffles and, similarly, the end plate 48 of each movable shuffle is curved and lies closely adjacent the upper surface of the associated stationary shuffle. A discharge chute 49 is secured to the walls 17 and 18 and has a concave upper surface 51 which receives singulated and oriented pears from the last stationary shuffle and discharges the pears one at a time, and stem end foremost, into cups 52 of a pear preparation machine of well known design.

In the operation of the pear feeding and orienting apparatus of the present invention, pears are fed one at a time down the feed chute 47 onto the shuffles. The concave surface 46 of the shuffles causes each pear to roll to a position where its stem-blossom axis is disposed parallel to the direction of movement of the pear. If the pear is positioned with its stem end lowermost as indicated by the pear P1 in FIG. 6, the weight of the heavy butt end of the pear will, as the pear is pushed upwardly along the stationary shuffle 11 by a movable shuffle 12, partially fall and partially roll over the curved end of the associated stationary shuffle 11 onto the next movable shuffle 12 into the position indicated by the pear P1 in FIG. 7. In most cases the pear P1 will roll directly into the properly oriented nose forward position shown in FIG. 8 upon completion of the forward stroke of the movable shuffles 12. If, however, a pear P3 remains in the position shown in FIG. 8 after the movable shuffle 12A, which moved pear P3 to that position, has reached top dead center, the subsequent downward movement of the pear supporting shuffle 12B will apply a frictional force to the pear which will tend to rotate the pear to the properly oriented position. When the pear supporting movable shuffle 12 moves to a point where its curved end plate 48 has moved rearwardly of the center of gravity of the pear, the pear, aided by the rotative force applied thereto, will rotate and gravitate onto the next stationary shuffle in the properly oriented position.

The pears P2 which are properly oriented, i.e., with their stem ends foremost, when they enter the shuffles or which are oriented by the first few shuffles, will be advanced by the movable shuffles until the center of gravity passes the curved end plate 48 of the stationary shuffle supporting the pear P2. The pear then rolls clockwise (FIG. 7) until the elongate stem end terminates such rotation. Continued movement of the movable shuffles pushes the pear stem end foremost until the pear P2 is supported on the next movable shuffle. This movable shuffle is then retracted from under the pear permitting the pear to fall stem end foremost onto the next stationary shuffle. The properly oriented pears are advanced in this way until the last movable shuffle engages the pear and pushes it onto the discharge chute 49 which guides the pear into one of the cups 52 of the pear preparation machine.

As mentioned previously, the curved upper pear supporting surfaces 46 of the shuffles assure that the pear will be supported in a position where their stem-blossom axes will be parallel to the path of movement of the pears. It should now be recognized that the curvature of the upper edge of the end plates 48 cooperate in maintaining this alignment when the pears are rotated from a stem rearmost to a stem foremost position by providing a wider supporting edge for the ball of the pear as it rotates.

It is apparent from the foregoing description that the pear feeding and orienting apparatus of the present invention includes shuffles having concave supporting surfaces and concave pear pushing surfaces for first aligning the pears with their stem blossom axes parallel and then orienting the pears with their stem ends foremost. In addition, the pear feeding and orienting apparatus then feeds the pears in single file and at timed intervals to cups of a fruit preparation machine.

While one embodiment of the present invention has been shown and described, it will be understood that various changes and modifications may be made without departing from the spirit of the invention or the scope of the appended claims.

Having thus described the present invention and the manner in which the same is to be used, what is claimed as new and desired to be protected by Letters Patent is:

1. A pear feeding and orienting apparatus comprising an upwardly inclined stationary shuffle having an upper concave pear aligning surface and a forward concave abutment plate, an upwardly inclined movable shuffle having an upper concave pear aligning surface, said last mentioned surface terminating in a compound curved upper edge, and means for reciprocating said movable shuffle along a path parallel to the inclination of said stationary shuffle for moving a pear upwardly along said concave pear aligning surface of said stationary shuffle causing said pear to fall over said compound curved upper edge with its stem end foremost.

2. A pear feeding and orienting apparatus comprising an upwardly inclined stationary shuffle having an upper concave pear aligning surface and a forward concave abutment plate, said surface and said plate cooperating to define a compound curved upper edge, an upwardly inclined movable shuffle having an upper concave pear aligning surface and a pear pusher plate on its forward edge, said plate being concave and having its lower edge disposed closely adjacent said concave pear aligning surface of said stationary shuffle, and means for reciprocating said movable shuffle for moving a pear upwardly along said concave pear aligning surface of said stationary shuffle causing said pear to fall over said compound curved upper edge with its stem end foremost and with its stem-blossom axis lying in a vertical plane parallel to the axes of curvature of said pear aligning surfaces.

3. A pear feeding and orienting apparatus comprising a plurality of spaced upwardly inclined stationary shuffles having upper concave pear aligning surfaces and forward concave pear abutment plates, a plurality of spaced upwardly inclined movable shuffles, each movable shuffle being disposed between adjacent stationary shuffles and having an upper concave pear aligning surface and a forward concave pear advancing plate, a carrier connected to each of said movable shuffles, and means connected to said carrier for reciprocating said carrier and said movable shuffle along a path parallel to the inclination of said stationary shuffles.

4. A pear feeding and orienting apparatus comprising a plurality of spaced upwardly inclined stationary shuffles having upper concave pear aligning surfaces and forward concave pear abutment plates, said surface and said plate of each stationary shuffle intersecting to define a compound curved upper edge, a plurality of spaced upwardly inclined movable shuffles, each movable shuffle being disposed between adjacent stationary shuffles and having an upper concave pear aligning surface and a forward concave pear advancing pusher plate, said aligning surface and said pusher plate of each movable shuffle intersecting to define a compound curved upper edge, a carrier connected to each of said movable shuffles, and means connected to said carrier for reciprocating said carirer and said movable shuffles whereby upward movement of said pears along said concave pear aligning surfaces of said stationary shuffles causes said pears to fall over said compound curved upward edges of said associated stationary shuffles tending to orient the pears with their stem ends foremost and whereby downward movement of said movable shuffles applies a rotative force on said pears, which force tends to rotate the pears so that their stem ends are foremost.

5. In a feed mechanism of the shuffle feed type having a plurality of movable shuffles disposed adjacent stationary shuffles, the improvement which comprises an elongate movable shuffle having a concave upper fruit supporting surface and a pusher plate having a forward concave face, the walls defining said upper concave support surface and the walls defining said concave pusher face being effective to urge fruit toward the longitudinal centerline of the shuffle.

References Cited in the file of this patent
UNITED STATES PATENTS
2,908,375    Hoover _____ Oct. 13, 1959